United States Patent
Fujimori et al.

(10) Patent No.: US 7,766,381 B2
(45) Date of Patent: Aug. 3, 2010

(54) STEERING WHEEL WITH AIR BAG DEVICE

(75) Inventors: Takeshi Fujimori, Fuji (JP); Mamoru Takagi, Fuji (JP)

(73) Assignee: Nihon Plast Co., Ltd., Shizuoka (JP)

(*) Notice: Subject to any disclaimer, the term of this patent is extended or adjusted under 35 U.S.C. 154(b) by 132 days.

(21) Appl. No.: 12/133,847

(22) Filed: Jun. 5, 2008

(65) Prior Publication Data

US 2009/0058055 A1    Mar. 5, 2009

(30) Foreign Application Priority Data

Aug. 31, 2007   (JP) .............................. 2007-226548

(51) Int. Cl.
*B60R 21/16* (2006.01)

(52) U.S. Cl. ..................................... 280/731

(58) Field of Classification Search ................. 280/731; 40/593; *B60R 13/00*
See application file for complete search history.

(56) References Cited

U.S. PATENT DOCUMENTS

| | | | |
|---|---|---|---|
| 6,626,458 B2 * | 9/2003 | Fujita et al. | 280/728.3 |
| 6,672,614 B2 * | 1/2004 | Endo et al. | 280/731 |
| 6,837,514 B1 * | 1/2005 | Fujita et al. | 280/731 |
| 7,354,060 B2 * | 4/2008 | Thomas | 280/728.3 |
| 2002/0036397 A1 * | 3/2002 | Fujita et al. | 280/731 |
| 2002/0113418 A1 | 8/2002 | Endo et al. | |
| 2004/0174002 A1 | 9/2004 | Sauer | |

FOREIGN PATENT DOCUMENTS

| | | |
|---|---|---|
| EP | 0968888 A2 | 1/2000 |
| EP | 1157903 A2 | 11/2001 |
| EP | 1493545 A1 | 1/2005 |
| EP | 1607278 A1 | 12/2005 |
| GB | 2270657 A | 3/1994 |
| JP | 2001-163156 A | 6/2001 |
| JP | 2001163156 A | 6/2001 |
| JP | 2004-268911 A | 9/2004 |
| JP | 2009006610 A * | 1/2009 |
| JP | 2009096450 A * | 5/2009 |
| JP | 2009166780 A * | 7/2009 |
| WO | 2008126867 A1 | 10/2008 |

OTHER PUBLICATIONS

European Search Report for corresponding European Patent Application No. 08010209.8, dated Mar. 3, 2010.

* cited by examiner

*Primary Examiner*—Faye M. Fleming
(74) *Attorney, Agent, or Firm*—Sughrue Mion, PLLC

(57) ABSTRACT

A steering wheel with an air bag device includes: a steering wheel body having: an annular rim portion; a boss portion; a plurality of spoke portions; an upper space; and a plurality of lower spaces. The air bag device is mounted to the steering wheel body, the air bag device includes: an air bag; an inflator; a cover member covering the air bag; and an emblem disposed at a substantially central portion of a front surface of the cover member confronting a driver's seat. The cover member includes a tear line arranged to break to form a plurality of door portions each arranged to pivot toward one of the upper and lower spaces. The tear line is formed to pivot the emblem to one of the lower spaces of the steering wheel body when the cover member is broken at the inflation of the air bag.

5 Claims, 7 Drawing Sheets

STEERING WHEEL WITH AIR BAG DEVICE

BACKGROUND OF THE INVENTION

This invention relates to a steering wheel provided with an air bag device arranged to protect an occupant at collision of a vehicle.

Currently, an air bag device is provided on a driver side to protect a driver at the collision of a vehicle such as an automobile. In general, this air bag device is mounted to a steering wheel. For example, an air bag is received within a cover member in a folded state, and disposed so that the cover member is positioned at a substantially central portion of an annular rim portion of the steering wheel so as to confront the driver.

When the large impact is applied at the collision of the vehicle, the air bag device senses the impact, generates a high pressure gas from an inflator, and supplies the high pressure gas into the air bag. Consequently, the air bag breaks the cover member by the inflation pressure, deploys the cover member outwardly, and rapidly expands and deploys on the front of the driver. Therefore, the driver is supported by the deployed air bag to absorb the impact on the driver. On a back side surface confronting the air bag, there are formed tear lines (breakable portions) for readily rapidly breaking the cover member and for rapidly expanding and deploying the air bag.

In a steering wheel with an air bag device of related art, an emblem and so on of a maker or manufacturer is provided on the front surface of the cover member of the air bag device which is disposed on a substantially central portion of the steering wheel, for enhancing the design and showing the brand. However, this emblem is harder than the cover member, and is difficult to break. Therefore, the tear lines are formed on the cover member at positions to avoid the position of emblem.

A patent document 1 (Japanese Patent Application Publication No. 2001-163156) discloses a cover member for an air bag device arranged to rapidly break the cover member in a case in which an emblem is mounted on a front surface of the cover member. As shown in a front view of FIG. 7, a cover member 51 of the patent document 1 includes a first tear line 53 which is not disposed at a is position corresponding to an emblem 52, and a second tear line 54 which is disposed at a position corresponding to emblem 52. Second tear line 54 is weaker than first tear line 53.

In cover member 51 of this patent document 1, first and second tear lines 53 and 54 can have shorter lengths, relative to a cover member having the tear lines disposed at positions to avoid the emblem. Moreover, it is possible to rapidly break the weak tear line 54 by the inflation pressure. Therefore, the breakaway of first tear line 53 is promoted by the breakaway of second tear line 54 so as to improve the speed-up of the deployment of the air bag.

In recent years, the emblem mounted on the surface of the cover member tends to increase in the size for enhancing the decoration effect. That is, letters and figures used as the emblem increase in the size for effectively appealing a vehicle name and a maker name. Moreover, the emblem has the relatively larger size, with respect to the cover member. Accordingly, it is possible to show the cover member to the small size by the visual effect, and thereby to suppress the oppression of the driver.

A patent document 2 (U.S. Patent Application Publication No. 2004/174002 A1 (corresponding to Japanese Patent Application Publication No. 2004-268911)) discloses a cover member for an air bag device which is arranged to smoothly break the cover member in a case in which a large emblem is provided on a front surface of the cover member. This cover member includes tear lines disposed across the emblem. The emblem itself is formed with tear lines located at positions corresponding to the positions of the tear lines of the cover member to promote the breakaway. Accordingly, even when the large emblem is provided on the surface of the cover member, it is possible to smoothly break along the tear lines of the cover member and the tear lines of the emblem when the cover member receives the inflation pressure of the air bag.

FIG. 7 shows cover member 51 of the patent document 1. This cover member 51 is broken along tear lines 53 and 54 at the deployment of the air bag, so as to form an upper door portion 55, and lower left and right door portions 56a and 56b. Moreover, door portions 55, 56a and 56b are pivoted, respectively, to a plurality of spaces defined (surrounded) by a circular rim portion of the steering wheel, a boss portion disposed at a substantially central portion of the rim portion, and spoke portions each connecting the rim portion and the boss portion. In this case, the upper space defined within the steering wheel serves as an opening through which the driver can see a meter.

However, this cover member 51 breaks along first and second tear lines 53 and 54 at the deployment of the air bag, and upper door portion 55 is pivoted to the upper space. This upper door portion 55 is mounted with an emblem 52. Accordingly, in a case in which emblem 52 has a large size, upper door portion 55 becomes large in size. When upper door portion 55 is pivoted, upper door portion 55 widely blocks the upper region for seeing the meter. This is not preferred because the driver becomes difficult to see the meter. Accordingly, in cover member 51 of patent document 1, it is difficult to increase the size of emblem 52.

On the other hand, the cover member of the patent document 2 is formed with the tear lines, and moreover the emblem is formed with the tear lines. However, in the cover member of the patent document 2, it is necessary to appropriately form the breakable portions so as to surely break the hard emblem, and to mount the emblem to the door portions of the cover member so as not to release the broken emblem. Therefore, material and shapes of the cover member and the emblem are limited. Moreover, it requires the high technology as to the design, the process control and the quality control. Consequently, the manufacturing cost is increased.

By the way, the air bag device is mounted to the steering wheel so as to appropriately ensure the safety of the driver by the deployment of the folded air bag, on the assumption that the driver sits on the driver's seat in a normal driving posture. Moreover, it is also required to decrease the pressure of the air bag to the driver at the deployment of the air bag to ensure the safety of the driver, in a case in which that the driver is in an out-of-position that the driver is nearer to the steering wheel relative to the normal posture.

Therefore, in cover member 51 of the patent document 1 shown in FIG. 7 and the cover member of the patent document 2, the door portions are formed by the breakaway of the tear lines at the inflation of the air bag, pivoted, respectively, to the spaces formed within the steering wheel, and pushed into those spaces.

Accordingly, even when the air bag is inflated while the driver is in the out-of-position, the upper and lower door portions of the air bag are pushed into the spaces of the steering wheel. Therefore, it is possible to escape the part of the air bag hit on the driver from the spaces of the steering wheel in the forward direction of the vehicle. Consequently, it is possible to suppress the force of the air bag which pushes the driver in the rearward direction, and to ensure the safety of the driver.

However, in the air bag device, it is required to further improve the safety of the driver who is in the out-of-position to safely surely protect the driver in any situations. This technology is still being developed positively.

SUMMARY OF THE INVENTION

It is an object of the present invention to provide a steering wheel with an air bag device which is devised to break a cover member mounted with a large emblem without providing a tear line to the emblem, to smoothly deploy the air bag without blocking an upper space serving as an opening through which the driver sees a meter, and to protect the driver safely even when the driver is in an out-of-position.

According to one aspect of the present invention, a steering wheel with an air bag device, the steering wheel comprises: a steering wheel body including: an annular rim portion; a boss portion disposed at a substantially central portion of the rim portion; a plurality of spoke portions each connecting the rim portion and the boss portion; an upper space defined by the rim portion, the boss portion and adjacent two of the spoke portions; and a plurality of lower spaces each defined by the rim portion, the boss portion and adjacent two of the spoke portions, and each disposed at a position lower than the upper space when the steering wheel body is in a neutral position, each of the lower space being smaller than the upper space, the air bag device being mounted to the steering wheel body, the air bag device including: an air bag folded by predetermined steps; an inflator arranged to generate an inflation gas for the air bag; a cover member covering the air bag; and an emblem disposed at a substantially central portion of a front surface of the cover member confronting a driver's seat, the cover member including a tear line arranged to break the cover member at an inflation of the air bag to form a plurality of door portions each arranged to pivot toward one of the upper and lower spaces, the tear line being formed to pivot the emblem to one of the lower spaces of the steering wheel body when the cover member is broken at the inflation of the air bag.

DETAILED DESCRIPTION OF THE INVENTION

Figure 1:
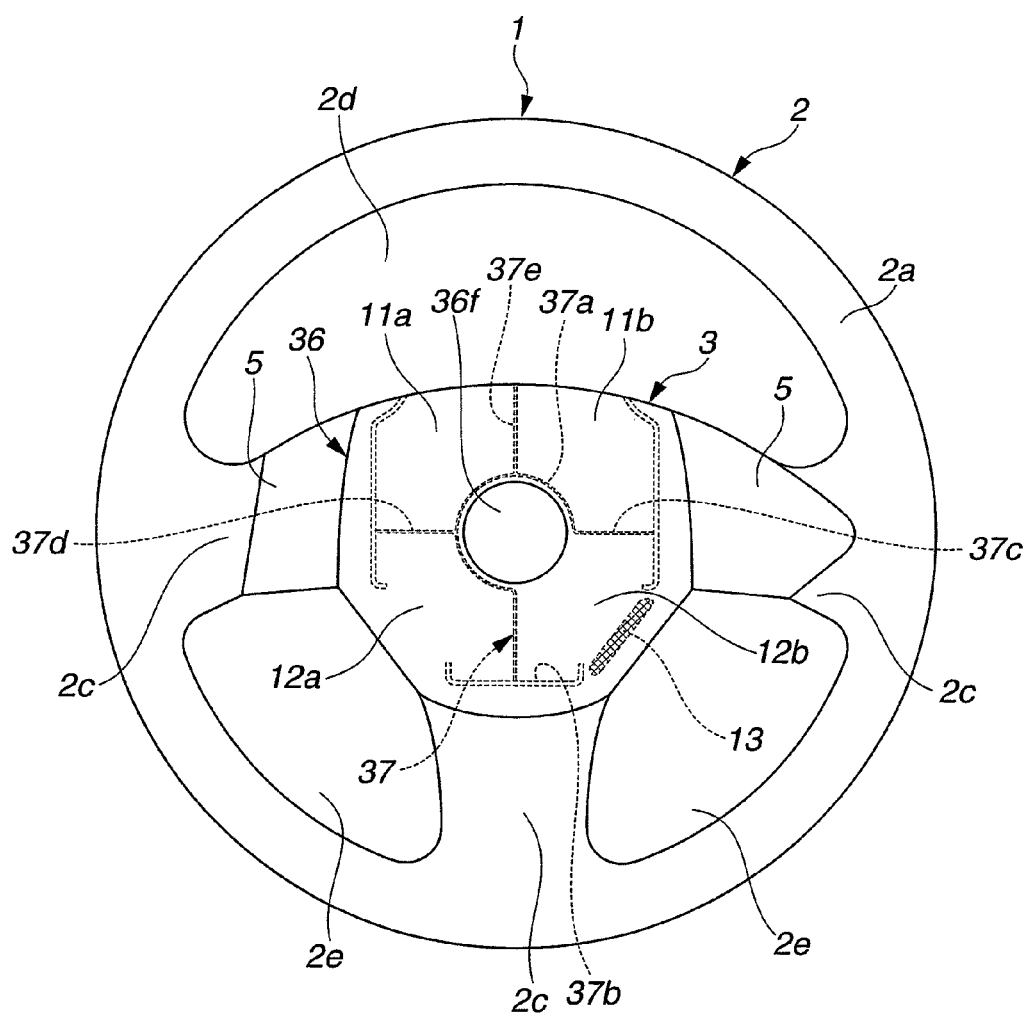
FIG. 1 is a front view showing a steering wheel according to one embodiment of the present invention.
Figure 2:
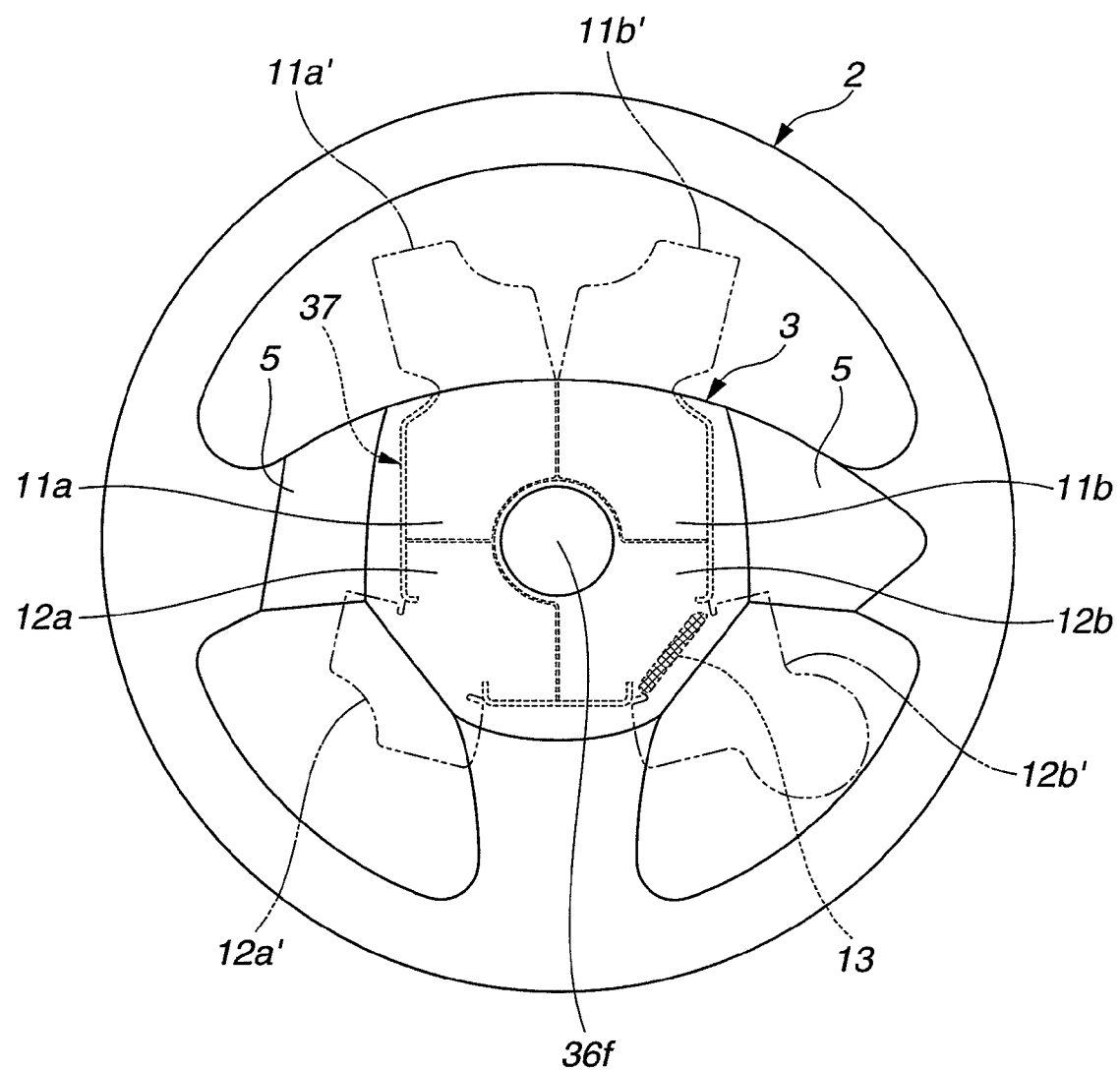
FIG. 2 is a schematic view for illustrating a state in which door portions of a cover member of the steering wheel of FIG. 1 are pivoted.
Figure 3:
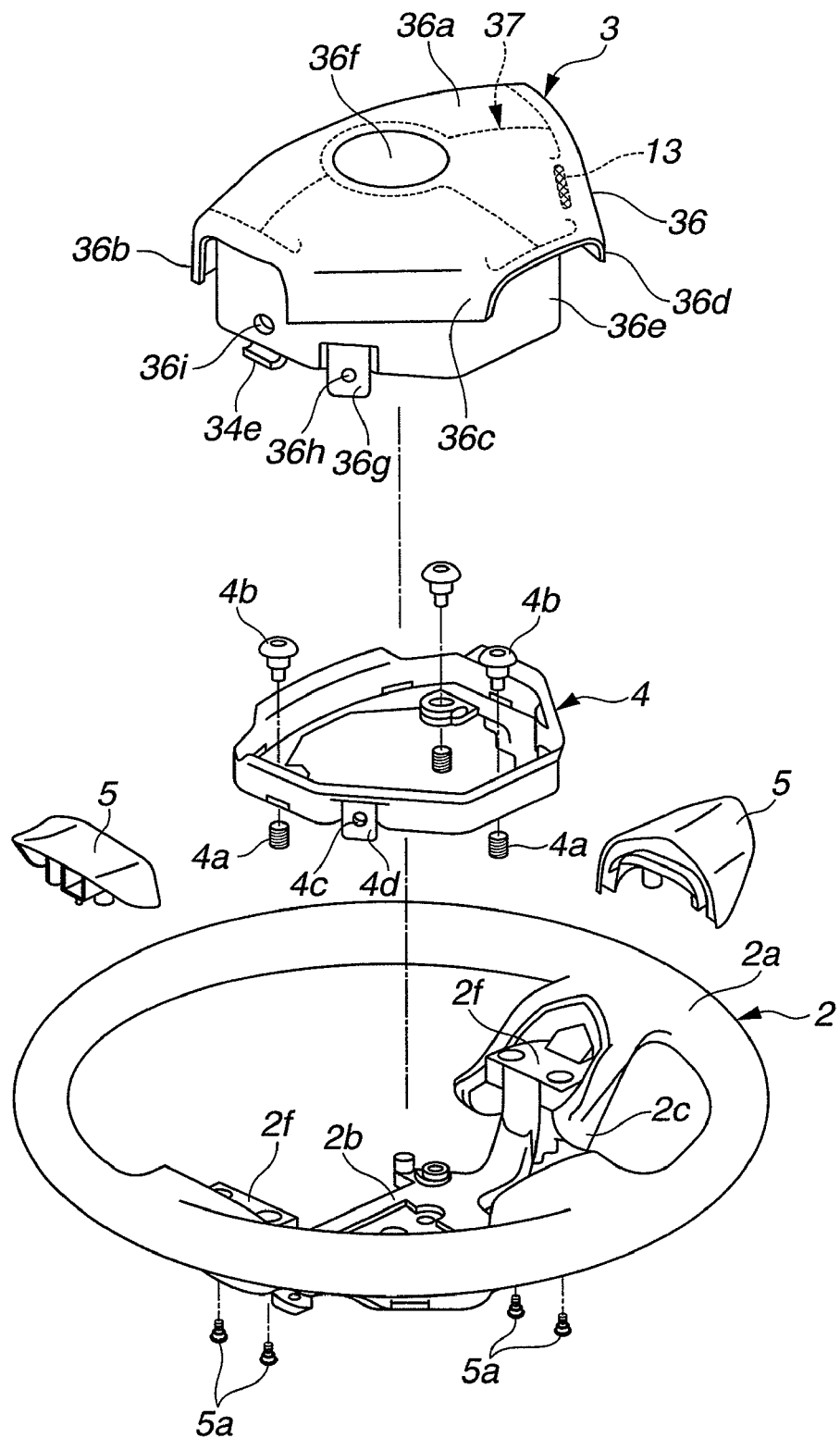
FIG. 3 is an exploded perspective view showing the steering wheel of FIG. 1.
Figure 4:
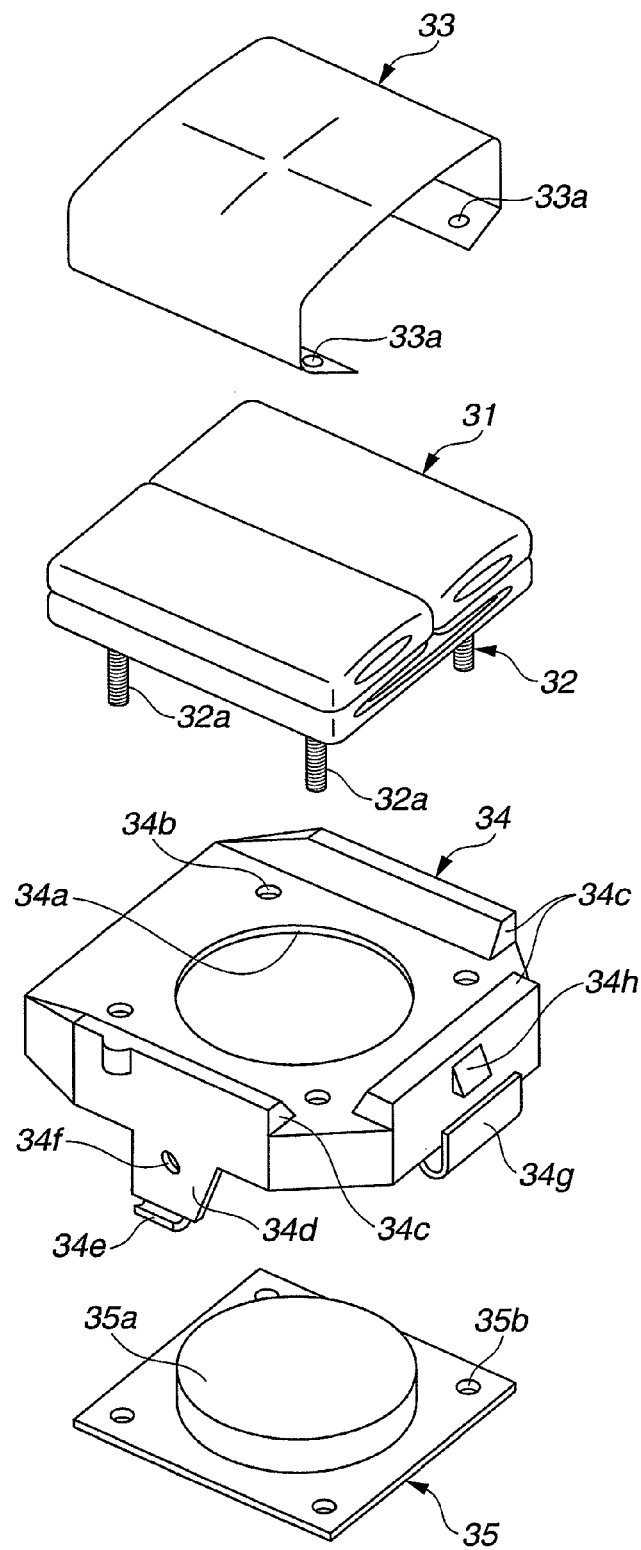
FIG. 4 is an exploded perspective view showing components mounted to the steering wheel of FIG. 1, except for the cover member of the air bag.
Figure 5:
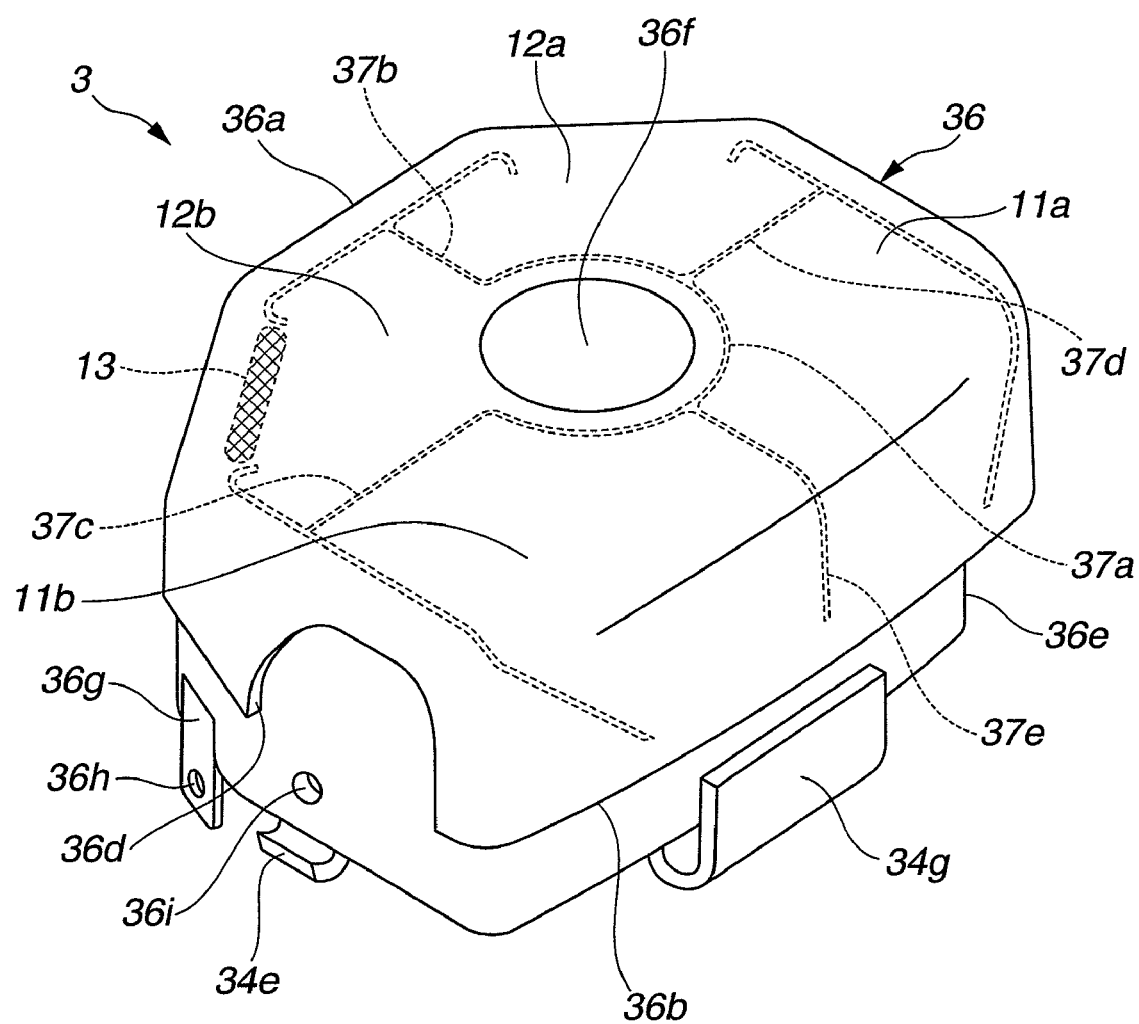
FIG. 5 is a perspective view showing the air bag device.

Hereinafter, a steering wheel with an air bag device according to one embodiment of the present invention will be illustrated with reference to drawings. FIG. 1 is a front view showing a steering wheel according to one embodiment of the present invention. FIG. 2 is a schematic view for illustrating a state in which door portions of a cover member of the steering wheel of FIG. 1 are pivoted. FIG. 3 is an exploded perspective view showing the steering wheel of FIG. 1. FIG. 4 is an exploded perspective view showing components mounted to the steering wheel of FIG. 1, except for the cover member of the air bag. FIG. 5 is a perspective view showing the air bag device.

A steering wheel 1 according to the embodiment of the present invention includes a steering wheel body 2; a horn plate 4 mounted to steering wheel body 2; and an air bag device 3 mounted through horn plate 4 to a front surface of steering wheel body 2 on a driver's seat's side.

Steering wheel body 2 includes an annular rim portion 2a; a boss portion 2b located at a substantially central portion of rim portion 2a; and three spoke portions 2c connecting rim portion 2a and boss portion 2b. In this example, three spokes 2c are arranged in a substantially T-shape in the front view of the steering wheel body 2 of FIG. 1. Hereinafter, leftward and rightward directions correspond to directions in which two of the spokes 2c are arranged in a substantially straight line when steering wheel 1 is in a neutral position, and correspond to leftward and rightward directions of FIG. 1. Upward and downward directions correspond to a direction which is perpendicular to the leftward and rightward directions, and in which one of the spoke 2c is disposed, and correspond to upward and downward directions of FIG. 1.

In this embodiment, steering wheel body 2 includes an upper space 2d and two lower spaces 2e defined by rim portion 2a, boss portion 2b and three spokes 2c. Lower spaces 2e are smaller than upper space 2d. Steering wheel body 2 includes finisher mounting portions 2f formed on the right and left spokes 2c arranged in the rightward and leftward directions of the steering wheel body 2. Two decoration finishers 5 are mounted, respectively, on finisher mounting portions 2f by screws 5a.

Horn plate 4 serving as a supporting member is mounted by fixing bolts 4b through coil springs 4a on the upper surface of boss portion 2b of steering wheel body 2. Horn plate 4 includes mounting portions 4d each having a hole 4c. A cover member 36 of the air bag device 3 is fixed to mounting portion 4d by bolts and so on.

This air bag device 3 is mounted through horn plate 4 to steering wheel body 2. Air bag device 3 includes an air bag 31 arranged to expand and deploy; a ring retainer 32 mounted to air bag 31; a wrapping sheet 33 wrapping or covering air bag 31; a base member 34 supporting air bag 31; an inflator 35 arranged to supply an inflation gas for inflating the air bag, into air bag 31; and a cover member 36 arranged to cover these components.

Air bag 31 is folded by predetermined steps with regularity so as to smoothly inflate and deploy when supplied with the inflation gas from inflator 35. This air bag 31 includes a circular opening (not shown) positioned on a back surface, and arranged to receive inflator 35; and four small holes (not shown) disposed around that circular opening. In this example, the folding steps and folding manner are not limited, and it is possible to arbitrarily vary in accordance with installation and so on of the air bag device.

Ring retainer 32 serving as a holding member is mounted on an inner surface of the periphery of the opening of air bag 31. This ring retainer 32 includes an annular main body (not shown); and four stud bolts 32a disposed to protrude downwardly from the main body. These stud bolts 32a protrude from the lower surface of air bag 31 through the small holes formed in air bag 31.

Wrapping sheet 33 wraps air bag 31 folded in the predetermined shape so as to hold the folded state of air bag 31. This wrapping sheet 33 is formed of a substantially rectangular flexible sheet, and formed with four insertion holes 33a located near corners of wrapping sheet 33, and each arranged to receive one of stud bolts 32a.

Base member 34 includes an inflator insertion hole 34a formed at a center portion; and four stud bolt insertion holes 34b formed around inflator insertion hole 34a. Base member 34 further includes stepped portions 34c protruding from a supporting surface (the front surface) which supports and sandwich air bag 31 with ring retainer 32, and being disposed along three side portions of base member 34. By this stepped portions 34, it is possible to stabilize the position of folded air bag 31, and to effectively hold the folded shape of air bag 31.

Base member 34 includes protruding portions 34d each protruding from the left and right side walls in the back side direction, and each having a first hook portion 34e for mounting cover member 36 to the end portion of protruding portion 34d, and a hole portion 34f for receiving a rivet and so on. Base member 34 further includes a second hook portion 34g formed on the lower side wall of base member 34, and arranged to mount cover member 36; and an engagement portion 34h arranged to engage with cover member 36.

Inflator 35 includes a gas generation portion 35a arranged to generate the inflation gas; and four insertion holes 35b for inserting stud bolts 32a of ring retainer 32. Inflator 35 is mounted on the back surface of base member 34 in a state in which gas generation portion 35a is inserted through inflator insertion hole 34a of base member 34 into air bag 31.

Cover member 36 includes an occupant confronting surface portion 36a confronting the driver's seat; three extension portions 36b, 36c and 36d continuously extending by bending, respectively, from the upper end, lower left and right end of occupant confronting surface portion 36a; and a side wall portion 36e protruding in the back side direction from the back side surface of occupant confronting surface portion 36a. Cover member 36 includes a circular emblem 36f mounted on the front surface at a central portion of occupant confronting surface portion 36a. In this embodiment, emblem 36f is formed as a member different from cover member 36, and mounted to cover member 36. However, it is possible to integrally form emblem 36f with cover member 36.

Tear line 37 is formed on the back side surfaces of occupant confronting surface portion 36a and upper extension portion 36b of cover member 36. Tear line 37 is formed into recessed grooves so that cover member 36 is readily broken when cover member 36 receives the inflation pressure from air bag 31.

This tear line 37 includes a substantially C-shaped first line 37a formed to turn around emblem 36f so as not to coincide with the position of the emblem 36f; a substantially T-shaped second line 37b extending downwardly from one end of first line 37a; a substantially T-shaped third line 37c extending rightward from the other end of first line 37a; a substantially T-shaped fourth line 37d extending leftward from a substantially intermediate portion of first line 37a; and a substantially straight fifth line 37e extending upward from a substantially intermediate portion of first line 37a. In this case, upper portions of third and fourth lines 37c and 37d, and fifth line is 37e are formed in occupant confronting surface portion 36a and upper extension portion 36b.

By this tear line 37, cover member 36 is separated into upper left and right door regions 11a and 11b arranged to pivot toward upper space 2d of steering body 2 at the expansion of air bag 31; and lower left and right door regions 12a and 12b arranged to pivot toward lower space 2e of steering body 2. In a case in which the door portions formed by breaking the tear line are formed to pivot toward the spoke portions, the door portions are not fully pivoted, and may effect the movement of the expansion of the air bag. Therefore, door portions 11a', 11b', 12a' and 12b' are arranged to be pivoted to upper and lower spaces 2d and 2e as shown in FIG. 2.

Moreover, tear line 37 of cover member 36 is formed to pivot emblem 36f to lower right space 2e of steering wheel 2 when cover member 36 is broken by the inflation pressure of air bag 31. That is, emblem 36f is mounted to lower right door region 12b of cover member 36.

Moreover, occupant confronting surface portion 36a of cover member 36 includes a flexible portion 13 which has a thickness thinner than thicknesses of the other portions, and which is located in an outer circumference portion of lower right door region 12b. In this way, flexible portion 13 is formed in lower right door portion 12b provided with emblem 36f. Accordingly, it is possible to readily sag and bend door region 12b' even in a case in which lower right door portion 12b' strikes on rim portion 2a of steering wheel body 2 or a hand of the driver when lower right door portion 12b' is pivoted at the expansion of air bag 31, and thereby to absorb the impact.

On side wall portion 36e of cover member 36, there are provided mounting members 36g each having a hole 36h located at a position corresponding to mounting portion 4d of horn plate 4. On the back side of the periphery of hole portion 36h of each mounting member 36g, there is fixed a nut (not shown) into which the bolt is fit. Side wall portion 36e of cover member 36 includes hole portions 36i into which rivet and so on are inserted respectively, and each of which is located at a position corresponding to hole portion 34f of protruding portion 34d of base member 34 when the assembly obtained from air bag 31, wrapping sheet 33, base member 34, and inflator 35 is received in cover member 36.

In the assembling operation of steering wheel 1, air bag 31 is mounted with ring retainer 32, and fold with the regularity in accordance with the predetermined steps. Then, the folded air bag 31 is wrapped and covered by wrapping sheet 33 to hold the folded state.

Then, base member 34 and inflator 35 are mounted to stud bolts 32a of ring retainer 32 protruding from the back side of air bag 31. Stud bolts 32a are screwed into the nuts, and consequently base member 34 and inflator 35 are fixed, so that the assembly is obtained.

Subsequently, the assembly is fit in cover member 36 to coincide the directions. First and second hook portions 34e and 34g of base member 34 are engaged with side wall portion 36e of cover member 36. Moreover, the rivet and so on are inserted through hole portions 36i of side wall portion 36e of cover member 36 and hole portions 34f of right and left protruding portions 34d of base member 34 to fix base member 34 and cover member 36, so that air bag device 3 is obtained.

Then, horn plate 4 is mounted by fixing bolts 4b through coil springs 4a to steering wheel body 2 mounted with finisher 5. Subsequently, air bag device 3 is mounted to horn plate 4. In this case, the positions of mounting portions 4d of horn plate 4 corresponds to the positions of mounting members 36g of cover member 36, and the bolts are inserted through hole portions 4c of mounting portions 4d and hole portions 36h of mounting members 36g to fix. Accordingly, it is possible to readily mount air bag device 3 to horn plate 4. Consequently, steering wheel of FIG. 1 is assembled.

In this steering wheel 1, air bag device 3 is activated at the collision of the vehicle, and inflator 35 generates the inflation gas to inflate air bag 31. Cover member 36 receives that inflation pressure of air bag 31. In this case, cover member 36 breaks along tear line 37, and accordingly door portions 11a', 11b', 12a' and 12b' are formed, and pivoted about the outer circumference end portions serving as the hinge portions, toward the upper and lower spaces 2d and 2e of steering wheel body 2.

Consequently, the opening is formed in cover member 36. Air bag 31 is expanded and deployed through the opening. In steering wheel 1 of this example, tear line 37 is also formed in upper extension portion 36b of cover member 36, and accordingly it is possible to readily form a larger opening in cover member 36 when upper left and right door portions 11a' and 11b' are pivoted toward upper space 2d. Therefore, it is possible to smoothly inflate and deploy air bag 31 from the opening, and to protect the driver safely.

In steering wheel 1 of this example, emblem 36f is mounted to region 12 of the lower right door portion of cover member 36 which is arranged to pivot toward lower right space 2e as shown in FIG. 2. Accordingly, it is possible to rapidly smoothly inflate air bag 31 toward the driver without breaking large emblem 36f. Accordingly, emblem 36f does not need breakable portions, and does not need the design, the process control and the quality control with the high difficulty. Therefore, it is possible to decrease the manufacturing cost.

Moreover, in this steering wheel 1 of this example, emblem 36f is not mounted to upper left and right door portions 11a' and 11b' which are pivoted toward upper space 2d. Accordingly, it is possible to decrease the size of upper door portions 11a' and 11b', relative to the cover member of the related art such as the patent document 1. Therefore, it is possible to decrease the area closed by upper door portions 11a' and 11b' within the upper space 2d of steering wheel body 2, and to ensure large opening portion through which the driver can see the meter.

In this way, there are ensured the large opening portions which are not closed by door portions 11a' and 11b' within upper space 2d. Accordingly, it is possible to readily escape, through the opening portion, the part of air bag 31 struck on the driver even when air bag 31 is inflated and deployed when the driver is in the out-of-position. Therefore, it is possible to effectively decrease the force of air bag 31 which pushes the driver in the rearward direction, relative to the apparatus of the related art, and to further ensure the safety of the driver.

In the steering wheel 1 of this example, it is possible to form upper left and right door portions 11a' and 11b' into the small size to decrease the weight. Accordingly, it is possible to decrease the load to the hinge portions for pivoting door portions 11a' and 11b', and to decrease the width and thickness of the hinge portion, relative to the apparatus of the related art. Therefore, it is possible to increase the flexibility of the hinge portion, to readily pivot upper door portions 11a' and 11b', and to smoothly inflate and deploy air bag 31.

Figure 6:
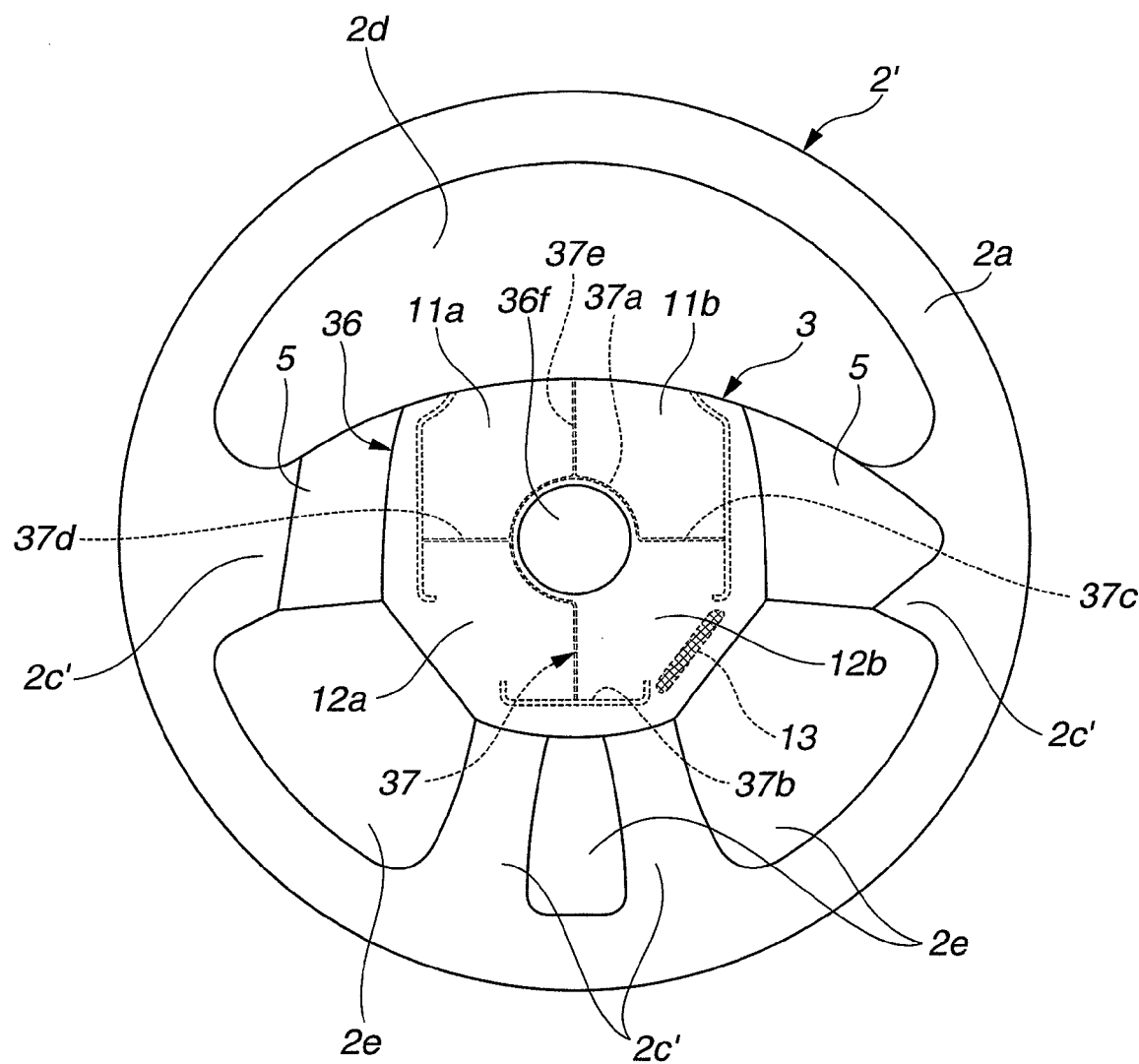
FIG. 6 is a front view showing a steering wheel in a variation according to the embodiment of the present invention.
Figure 7:
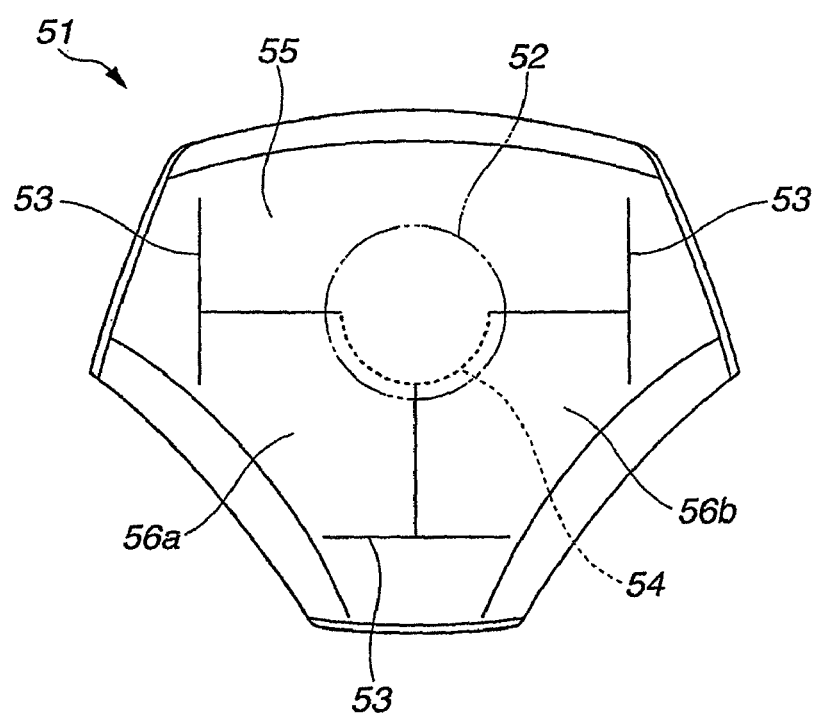
FIG. 7 is a cover member of a steering wheel of related art.

In this steering wheel 1 of this example, three spoke portions 2c are disposed in the substantially T-shape in steering wheel body 2. However, it is possible to provide four spoke portions 2c' to steering wheel body 2' as shown in FIG. 6, or to provide more spoke portions, as long as the door portions of the cover member can be smoothly pivoted toward the upper and lower spaces.

In this steering wheel 1 of this example, the upper door portion pivoted to the upper space 2d are separated into two right and left upper portions. However, it is possible to form the upper door portion as one upper door portion without separating into the two upper portions. Moreover, C-shaped first line portion 37a of tear line 37 of cover member 36 is formed to turn around emblem 36f to avoid the position of emblem 36f. However, it is possible to form C-shaped first line portion 37a along the circumference portion of emblem 36f to correspond to the position of emblem 36f, as long as emblem 36f does not influence the pivot movements of upper and lower door portions 11a', 11b', 12a' and 12b' when upper and lower door portions 11a', 11b', 12a' and 12b' are pivoted by breaking cover member 36.

The steering wheel with the air bag device 3 according to the embodiment of the present invention includes: a steering wheel body 2 including: an annular rim portion 2a; a boss portion 2b disposed at a substantially central portion of the rim portion 2a; a plurality of spoke portions (2c, 2c') each connecting the rim portion 2a and the boss portion 2b; an upper space 2d defined by the rim portion 2a, the boss portion 2b and adjacent two of the spoke portions (2c, 2c'); and a plurality of lower spaces 2e each defined by the rim portion 2a, the boss portion 2b and adjacent two of the spoke portions (2c, 2c'), and each disposed at a position lower than the upper space when the steering wheel body 2 is in a neutral position, each of the lower space 2e being smaller than the upper space 2d, the air bag device 3 being mounted to the steering wheel body 2, the air bag device including: an air bag 31 folded by predetermined steps; an inflator 35 arranged to generate an inflation gas for the air bag 31; a cover member 36 covering the air bag 31; and an emblem 36f disposed at a substantially central portion of a front surface of the cover member 36 confronting a driver's seat, the cover member 36 including a tear line 37 arranged to break the cover member 36 at an inflation of the air bag 3 to form a plurality of door portions (11a',11b',12a' 12b') each arranged to pivot toward one of the upper and lower spaces (2d, 2e), the tear line 37 being formed to pivot the emblem to one of the lower spaces 2e of the steering wheel body 2 when the cover member 36 is broken at the inflation of the air bag 3.

In this steering wheel with the air bag device according to the embodiment of the present invention, the emblem is mounted to the door portion region of the cover member which is pivoted to one of the lower space. Accordingly, it is possible to break the cover member along the tear line at the inflation of the air bag even when the large emblem is provided, and to pivot the door portions of the cover member without breaking the emblem, to smoothly rapidly inflate the air bag toward the driver.

Moreover, in the steering wheel with the air bag device according to the embodiment of the present invention, the emblem is mounted to the door portion of the cover member, and pivoted to the lower space at the deployment of the air bag. Accordingly, it is possible to decrease the size of the door portion which is pivoted to the upper space of the steering wheel body, relative to the cover member of the related art of the patent document 1.

Accordingly, even when the door portion of the cover member is pivoted at the inflation of the air bag, to the upper space which is widely formed in the steering wheel body, it is possible to prevent the upper space serving as the opening for seeing the meter, from being fully closed, and to ensure the opening portion of the upper region which is not closed by the door portion, relative to the cover member of the related art of the patent document 1.

In this way, the opening portion within the upper region which is not closed by the door portion is ensured largely. For example, when the air bag is deployed while the driver is in the out-of-position, it is possible to escape the part of the air bag struck on the driver, through the opening portion ensured in the upper region. Therefore, it is possible to effectively decrease the force of the air bag which pushes the driver in the rearward direction, relative to the apparatus of the related art, and to further ensure the safety of the driver.

In the steering wheel according to the embodiment of the present invention, the door portion pivoted to the upper space is decreased in size to decrease the weight of the door portion, as mentioned above. Accordingly, it is possible to decrease the load to the hinge portions for pivoting the door portion, and to decrease the width and the thickness of the hinge portion, relative to the apparatus of the related art. Therefore, it is possible to increase the flexibility of the hinge portion, to facilitate the pivot movement of the door portion to the upper region, and thereby to smoothly deploy the air bag.

In the steering wheel with the air bag device according to the embodiment of the present invention, the tear line includes a first line 37a formed into a substantially C-shaped line, and extending from a first end to a second end around the emblem 36f to avoid the emblem; a second line 37b formed into one of a substantially T-shaped line and a substantially straight line, and extending downward from the first end of the first line 37a; a third line 37c formed into one of a substantially T-shaped line and a substantially straight line, and extending from the second end of the first line 37a in one of a rightward direction and a leftward direction; and a fourth line 37d formed into one of a substantially T-shaped line and a straight line, and extending from the first line 37a in the other of the rightward direction and the leftward direction. In this way, the tear lines are formed at positions which do not correspond to the position of the emblem. Accordingly, it is possible to readily pivot the emblem to the lower space formed within the steering wheel at the inflation of the air bag.

In the steering wheel with the air bag device according to the embodiment of the present invention, the cover member 36 includes a first region 12b which forms one of the door portions 12b', and to which the emblem 36f is mounted; and the first region 12b of the cover member includes a flexible portion 13 located at an outer circumferential portion of the cover member. Accordingly, it is possible to readily sag and bend the door portion even when the door portion is struck on the rim portion of the steering wheel body or the hand of the driver, and thereby to absorb the impact. Moreover, it is possible to sag and bend the flexible portion on the outer circumference end even when the large emblem is mounted to the door portion, and thereby to smoothly pivot that door portion to the lower space smaller than the upper space. The flexible portion 13 is thinner than the one of the door portions 12b which is other than the flexible portion 13. Accordingly, it is possible to readily form the flexible portion.

In the steering wheel with the air bag device according to the embodiment of the present invention, the cover member 36 includes an occupant confronting surface portion 36a confronting the driver's seat, an extension portion (36b, 36c, 36d) bent and extending from an outer circumference end of the occupant confronting surface portion 36a, and a side wall portion 36e protruding in a back side direction from a back side of the occupant confronting surface portion 36a; and the tear line 37 is formed from the occupant confronting surface portion 36a to the extension portion 36b, and forms a second region (11a, 11b) forming one of the door portions (11a, 11b) which is pivoted to the upper space 2d. Accordingly, it is possible to readily form the large opening having the size capable of smoothly deploying the air bag.

This application is based on a prior Japanese Patent Application No. 2007-226548. The entire contents of the Japanese Patent Application No. 2007-226548 with a filing date of Aug. 31, 2007 are hereby incorporated by reference.

Although the invention has been described above by reference to certain embodiments of the invention, the invention is not limited to the embodiments described above. Modifications and variations of the embodiments is described above will occur to those skilled in the art in light of the above teachings. The scope of the invention is defined with reference to the following claims.

What is claimed is:

1. A steering wheel with an air bag device, the steering wheel comprising:
   a steering wheel body including:
      an annular rim portion;
      a boss portion disposed at a substantially central portion of the rim portion;
      a plurality of spoke portions each connecting the rim portion and the boss portion;
      an upper space defined by the rim portion, the boss portion and adjacent two of the spoke portions; and
      a plurality of lower spaces each defined by the rim portion, the boss portion and adjacent two of the spoke portions, and each disposed at a position lower than the upper space when the steering wheel body is in a neutral position, each of the lower space being smaller than the upper space,
   the air bag device being mounted to the steering wheel body, the air bag device including:
      an air bag folded by predetermined steps;
      an inflator arranged to generate an inflation gas for the air bag;
      a cover member covering the air bag; and
      an emblem disposed at a substantially central portion of a front surface of the cover member confronting a driver's seat,
      the cover member including a tear line arranged to break the cover member at an inflation of the air bag to form a plurality of door portions each arranged to pivot toward one of the upper and lower spaces, the tear line being formed to pivot the emblem to one of the lower spaces of the steering wheel body when the cover member is broken at the inflation of the air bag.

2. The steering wheel as claimed in claim 1, wherein the tear line includes a first line formed into a substantially C-shaped line, and extending from a first end to a second end around the emblem to avoid the emblem; a second line formed into one of a substantially T-shaped line and a substantially straight line, and extending downward from the first end of the first line; a third line formed into one of a substantially T-shaped line and a substantially straight line, and extending from the second end of the first line in one of a rightward direction and a leftward direction; and a fourth line formed into one of a substantially T-shaped line and a straight line, and extending from the first line in the other of the rightward direction and the leftward direction.

3. The steering wheel as claimed in claim 1, wherein the cover member includes a first region which forms one of the door portions, and to which the emblem is mounted; and the first region of the cover member includes a flexible portion located at an outer circumferential portion of the cover member.

4. The steering wheel as claimed in claim 3, wherein the flexible portion is thinner than the one of the door portions which is other than the flexible portion.

5. The steering wheel as claimed in claim 1, wherein the cover member includes an occupant confronting surface portion confronting the driver's seat, an extension portion bent and extending from an outer circumference end of the occupant confronting surface portion, and a side wall portion protruding in a back side direction from a back side of the occupant confronting surface portion; and the tear line is formed from the occupant confronting surface portion to the extension portion, and forms a second region forming one of the door portions which is pivoted to the upper space.

* * * * *